(12) United States Patent
Hirose et al.

(10) Patent No.: US 6,472,795 B2
(45) Date of Patent: Oct. 29, 2002

(54) ELECTROSTATIC ACTUATOR AND METHOD OF DRIVING THE SAME

(75) Inventors: Futoshi Hirose, Atsugi; Takayuki Yagi, Yokohama; Susumu Yasuda, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/791,845

(22) Filed: Feb. 26, 2001

(65) Prior Publication Data

US 2002/0047491 A1 Apr. 25, 2002

(30) Foreign Application Priority Data

Mar. 1, 2000  (JP) ........................................ 2000-055217

(51) Int. Cl.[7] ................................................ H02N 1/00
(52) U.S. Cl. ....................................................... 310/309
(58) Field of Search ........................... 310/309, 40 MM (56) References Cited

U.S. PATENT DOCUMENTS

| 3,143,671 A | * | 8/1964 | Gale | ........................... 310/309 |
| 4,754,185 A | * | 6/1988 | Gabriel et al. | ............... 310/309 |
| 5,955,800 A | * | 9/1999 | Shearwood et al. | .. 310/40 MM |
| 6,211,599 B1 | * | 4/2001 | Barnes et al. | ................ 310/309 |
| 6,329,737 B1 | * | 12/2001 | Jerman et al. | ............... 310/309 |
| 6,359,367 B1 | * | 3/2002 | Sumanaweera et all | .... 310/309 |

\* cited by examiner

*Primary Examiner*—Mark O. Budd
(74) *Attorney, Agent, or Firm*—Fitzpatrick, Cella, Harper & Scinto

(57) ABSTRACT

An electrostatic actuator includes a stator having a circular surface carrying a plurality of drive electrodes, a rotor arranged opposite to the surface of the stator and a drive circuit for applying a drive voltage to the drive electrodes. Each of the drive electrodes has an arcuate profile extending from the center toward the outer periphery of the circular surface. The rotor can be driven to rotate in either direction of rotation by changing the mode of applying voltages to the drive electrodes. The rotor is floated above the stator by dynamic pressure generated by an oscillator, typically a piezoelectric element, provided under the stator. The distance between the rotor and the stator can be adjusted by controlling drive voltages applied to the oscillator.

11 Claims, 6 Drawing Sheets

ELECTROSTATIC ACTUATOR AND METHOD OF DRIVING THE SAME

BACKGROUND OF THE INVENTION

1. Field of the Invention

This invention relates to an electrostatic actuator and a method of driving the same. More specifically, the present invention relates to an electrostatic actuator that does not comprise any structural bearing nor guide and is compact and adapted to support the rotor in a non-contact way and drive it in a desired direction of rotation with a low voltage.

2. Related Background Art

Various electrostatic actuators have been proposed in recent years. The electrostatic actuator provides the following advantages relative to the electromagnetic actuator.
(1) It is highly efficient and does not give rises to any loss in a stationary state.
(2) Since it comprises only electrodes, it is structurally simple and adapted to down-sizing.

Figure 1:
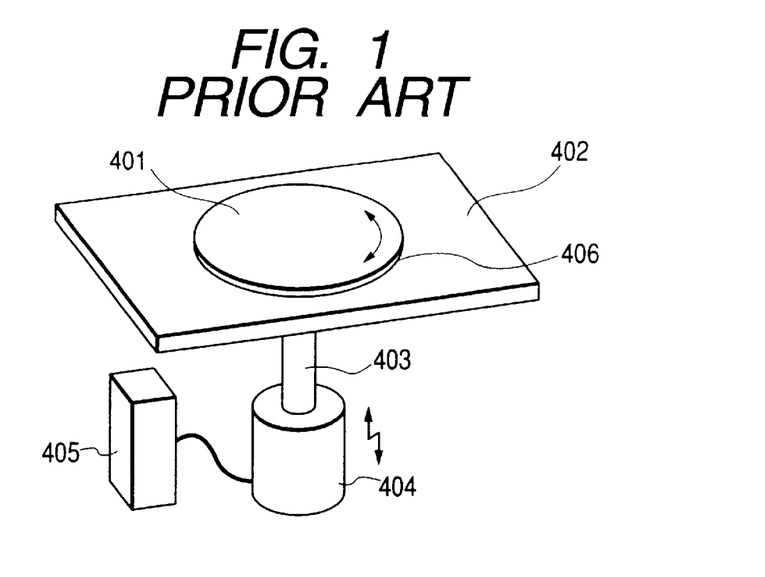
FIG. 1 is a schematic perspective view of a floating rotary drive system, using a conventional electrostatic actuator.
Figure 2:
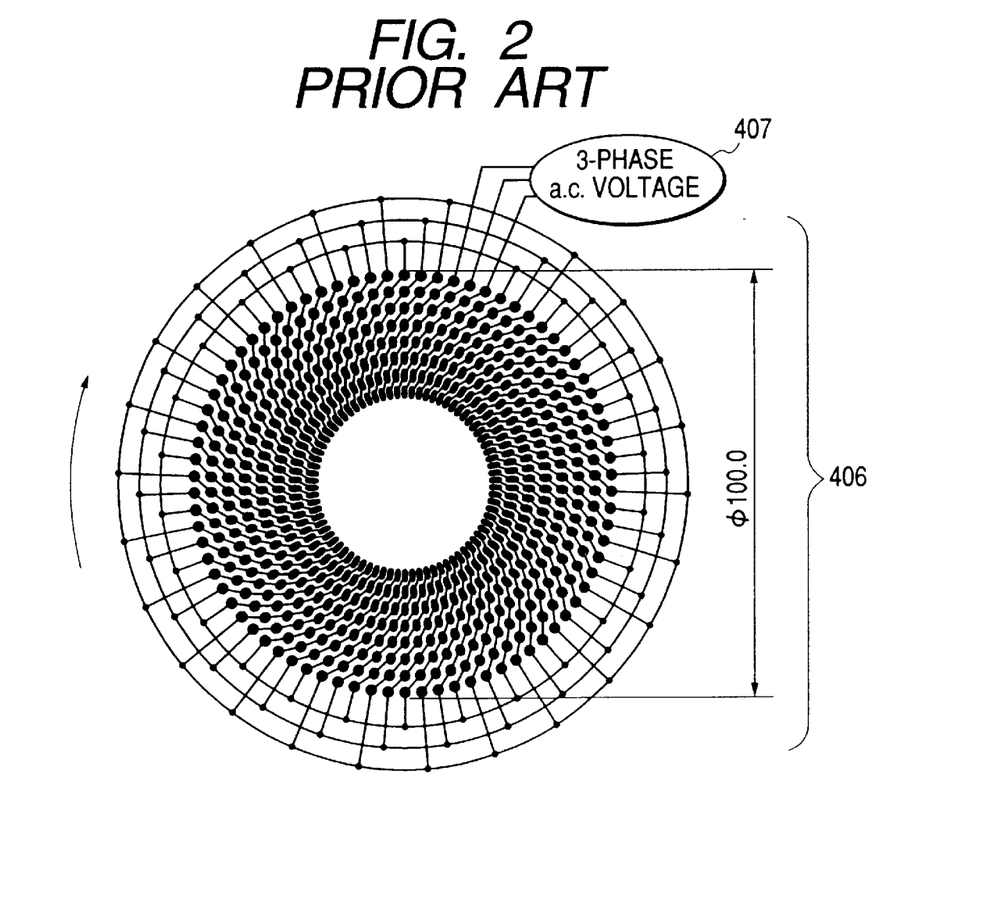
FIG. 2 is a schematic illustration of the pattern of arrangement of the electrodes on the stator of the electrostatic actuator of FIG. 1.

FIG. 1 of the accompanying drawings is a schematic perspective view of a floating rotary drive system using an electrostatic actuator that was proposed at page 537 of the released papers for the lectures in the 1998 Spring Meeting of the Japan Society for Precision Engineering. The floating rotary drive system uses an electrostatic actuator comprising a rotor 401 and a stator 402 and is designed to eliminate the frictional force between the rotary 401 and the stator 402 by causing the rotor 401 to acoustically float relative to the stator 402. FIG. 2 schematically illustrates the pattern of arrangement of the electrodes on the stator 402 of the electrostatic actuator of FIG. 1.

Referring to FIGS. 1 and 2, the oscillator 404 is driven to operate according to a signal from oscillator driver 405. With this electrostatic actuator, an acoustic floating force is generated on the surface of the stator 402 as the oscillator 404 is driven to operate and the oscillation of the oscillator 404 is amplified by means of a horn 403 so that the rotor 401 is supported above the surface of the stator 402 in a non-contact way. Thus, the rotor 401 is driven to rotate as a drive voltage is applied to drive electrodes 406 according to the signal from electrostatic drive circuit 407. The drive voltage output from the electrostatic drive circuit 407 is a 3-phase AC voltage. The rotor is made of glass.

As shown in FIG. 2, a large number of circular electrodes 406 are arranged on the stator 402 so that both a torque and a centripetal force arise simultaneously and are applied to the rotor 401. The drive voltage is 1 kV p-p and the rotor 401 rotates only clockwise.

The above described known electrostatic actuator is, however, accompanied by the following problems. Firstly, the rotor of the electrostatic actuator rotates only clockwise. Secondary, the electrodes of the stator have a circular profile and are separated from adjacent ones by a large distance so that the inductive electric charge generated on the rotor is located remote from the electrodes on the stator to consequently reduce the rotary force that is actually applied to the rotor. In other words, a large drive voltage is required to make the electrostatic actuator operate properly. Then, the overall arrangement will be rather bulky.

SUMMARY OF THE INVENTION

In view of the above identified problems of the prior art, it is therefore the object of the present invention to provide an electrostatic actuator that is compact and adapted to drive the rotor in a desired direction of rotation with a low drive voltage and a method of driving such an electrostatic actuator.

According to the invention, the above object is achieved by providing an electrostatic actuator comprising:
- a stator formed by a circular substrate having a surface carrying thereon a plurality of drive electrodes, each of the drive electrodes having an arcuate profile extending from the center of the substrate toward the outer periphery thereof;
- a rotor arranged opposite to the surface of the stator carrying thereon the drive electrodes; and
- a drive circuit for applying a drive voltage to the drive electrodes of the stator.

According to the invention, there is also provided a rotary stage comprising:
- an electrostatic actuator as defined above; and
- a sample holding jig arranged on the rotor of the electrostatic actuator.

According to the invention, there is also provided an optical scanning device comprising:
- a light source adapted to emit a laser beam;
- an electrostatic actuator as defined above; and
- a polygon mirror arranged on the rotor of the electrostatic actuator and adapted to deflect the laser beam emitted from the light source.

According to another aspect of the invention, there is also provided a method of driving an electrostatic actuator comprising a stator formed by a circular substrate having a surface carrying thereon a plurality of drive electrodes, each of the drive electrodes having an arcuate profile extending from the center of the substrate toward the outer periphery thereof, a rotor arranged opposite to the surface of the stator carrying thereon the drive electrodes, a drive circuit for applying a drive voltage to the drive electrodes of the stator and an oscillator for generating dynamic pressure between the stator and the rotor, the method comprising the steps of:
- generating dynamic pressure between the stator and the rotor by means of the oscillator to float the rotor above the stator; and
- applying a multiphase drive voltage to the drive circuit to drive the rotor to rotate.

DESCRIPTION OF THE PREFERRED EMBODIMENTS

Now, the present invention will be described in greater detail by referring to the accompanying drawings that illustrate a preferred embodiment of the invention.

Figure 3:
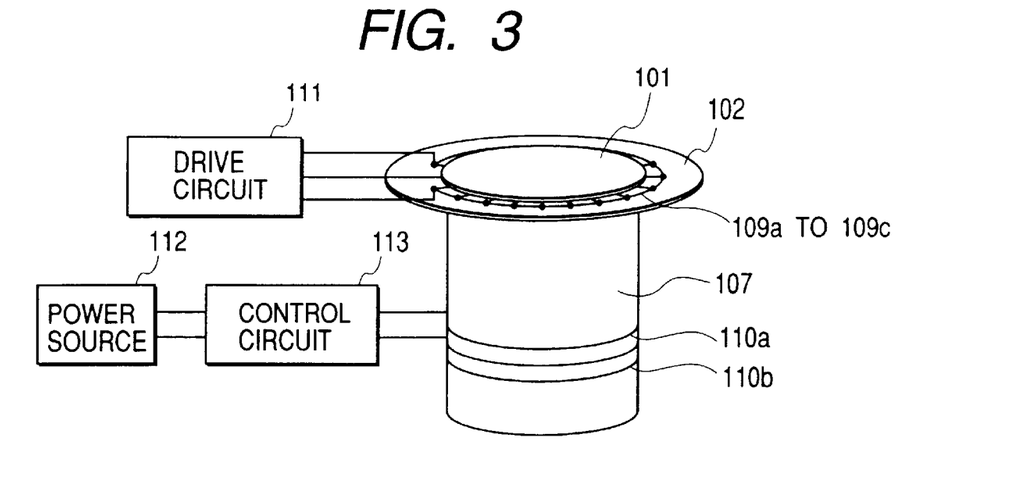
FIG. 3 is a schematic perspective view of a preferred embodiment of electrostatic actuator according to the invention.

FIG. 3 is a schematic perspective view of an embodiment of electrostatic actuator according to the invention. Referring to FIG. 3, an oscillator 107 and a rotor 101 are arranged respectively under and above a stator 102. As an AC voltage is applied by a power source 112 between the drive electrodes 110a and 110b of the oscillator 107, a squeeze film is produced between the rotor 101 and the stator 102 to support the rotor 101 above the stator 102 in a non-contact way. A control circuit 113 is arranged between the power source 112 and the oscillator drive electrodes 110a and 110b. The rotor 101 can be moved vertically to regulate the clearance between the stator 102 and the rotor 101 by changing the amplitude of the AC voltage by means of the control circuit 113.

A piezoelectric element can be used for the oscillator 107 so as to down-size the electrostatic oscillator.

In this embodiment, the surface of the stator 102 that is fitted to and covers the oscillator 107 has a surface area greater than the surface area of the oscillator 107 that is held in contact with the stator 102. With this arrangement, the rotor 101 can reliably be held on the stator 102.

Figure 4:
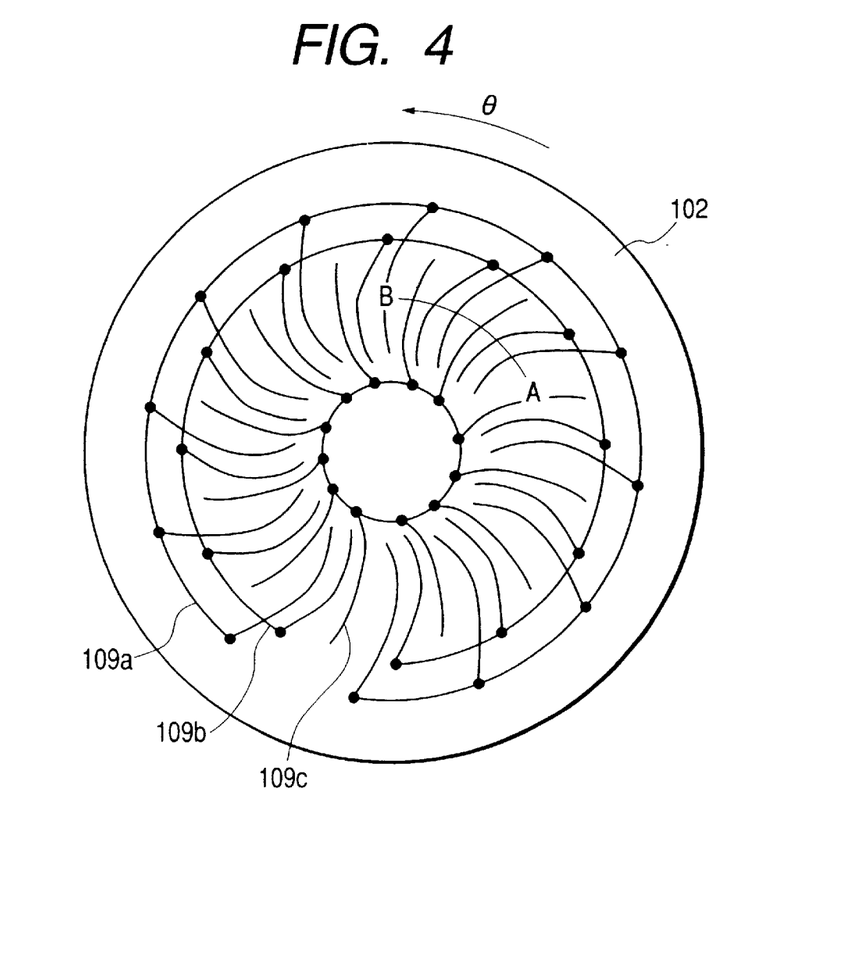
FIG. 4 is a schematic illustration of the pattern of arrangement of the electrodes on the stator of the electrostatic actuator of FIG. 3.

The rotor 101 is driven to rotate by means of the electrostatic force generated relative to the inductive electric charge generated on the rotor 101. As shown in FIG. 4, a plurality of drive electrodes having an arcuate profile are arranged radially on the stator 102. In this embodiment, the drive electrodes are divided into three drive electrode groups 109a through 109c and the drive electrodes of each of the groups are electrically connected to each other. A 3-phase drive voltage is applied to the drive electrode groups 109a through 109c from a drive circuit 111.

Figure 5A:
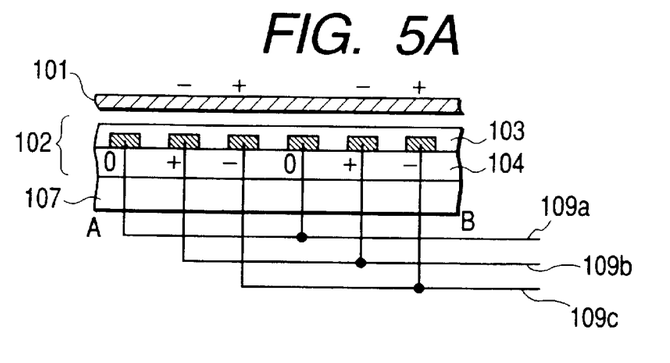
FIG. 5A and FIG. 5B are schematic cross sectional views of the embodiment of electrostatic actuator of FIG. 4 taken between A and B in FIG. 4.
Figure 5B:
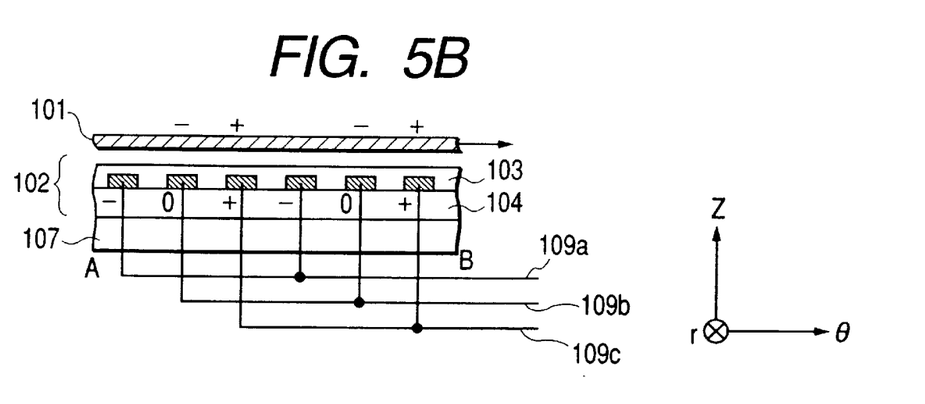

Now, the principle underlying the operation of driving an electrostatic actuator according to the invention will be described below. FIG. 5A and FIG. 5B are schematic cross sectional views of the embodiment of the electrostatic actuator of FIG. 4 taken peripherally between A and B in FIG. 4. The stator 102 includes a substrate 104 and drive electrode groups 109a through 109c and an insulating thin film 103 is formed between adjacently located electrodes and also on the surfaces of the electrodes. The oscillator 107 is located under the lower surface of the stator 102. Assume that the rotor 101 is driven to rotate in the direction of rotation represented by arrow θ in FIG. 4.

Figure 6A:
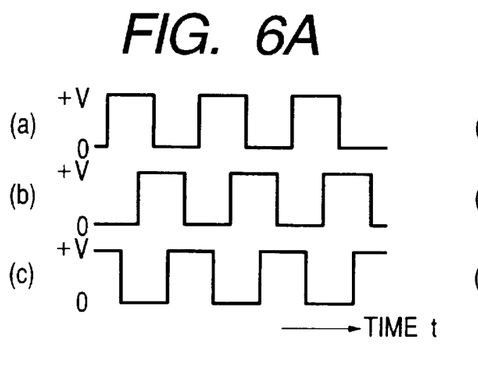
FIG. 6A and FIG. 6B are schematic illustrations of waveforms of two different signals that can be applied to the drive electrodes of the embodiment of electrostatic actuator of FIG. 4.
Figure 6B:
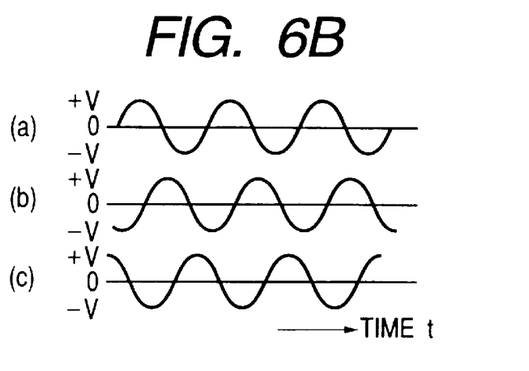

Firstly, the electrical potentials of the drive electrode groups 109a, 109b, and 109c are set respectively to 0, +, and − as shown in FIG. 5A. At that time, electric charges + and − are locally induced on the rotor 101 that is floated. Then, if the electrical potentials of the drive electrode groups 109a, 109b, and 109c are changed respectively to −, 0, and + as shown in FIG. 5B, both the electric charges induced on the rotor 101 and the electrical potentials of the stator 102 are subjected to an electrostatic force to consequently move the rotor 101 in the direction of +θ. If the change of the potentials is repeated, the rotor 101 is moved further in the direction of +θ. The voltage applied to the drive electrode groups 109a through 109c are made to have a waveform that changes with time, such as a rectangular waveform as shown in (a) through (c) of FIG. 6A or a 3-phase AC wave shown in (a) through (c) of FIG. 6B.

According to the invention, as the drive electrodes are formed to show an arcuate profile, the rotor is subjected to a rotary force and a centripetal force simultaneously so that it is driven to rotate on a stable basis without using any mechanical bearing. Additionally, according to the invention, because the distance separating adjacently located drive electrodes can be reduced, it is possible to bring the inductive electric charges generated on the rotor and the drive electrodes very close to each other to consequently raise the level of the force that is generated and applied to the rotor to drive the latter. Then, an electrostatic actuator according to the invention can be driven to operate with a low voltage if compared with conventional electrostatic actuators. Still additionally, since 3-phase drive electrodes can be arranged densely on the stator of an electrostatic actuator according to the invention so as to generate a rotary force at any position on the rotor, it is possible to drive the rotor to rotate bidirectionally.

Figure 7A:
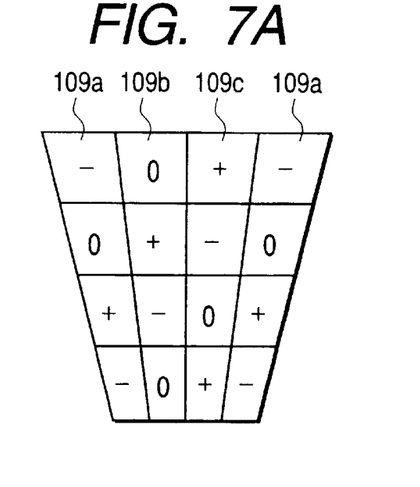
FIG. 7A and FIG. 7B are schematic illustrations of possible potential distributions on part of the stator of the embodiment of electrostatic actuator of FIG. 4.
Figure 7B:
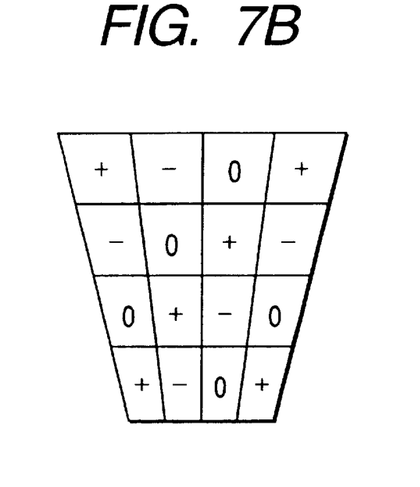
Figure 8A:
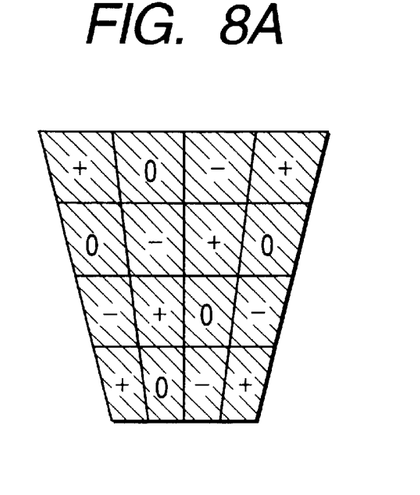
FIG. 8A and FIG. 8B are schematic illustrations of possible potential distributions on the rotor located above the stator of FIGS. 7A and 7B.
Figure 8B:
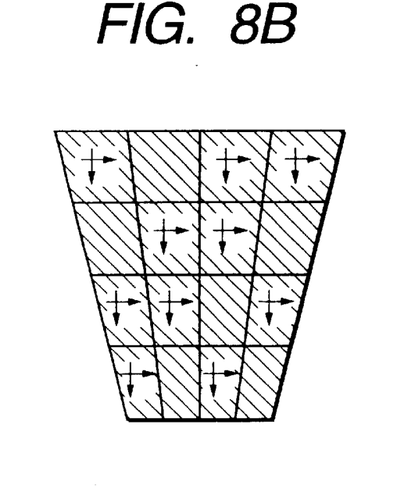

Now, the principle underlying the generation of the centripetal force of an electrostatic actuator according to the invention will be described below by referring to FIGS. 7A through 8B. FIG. 7A and FIG. 7B are schematic illustrations of possible potential distributions on part of the stator of the embodiment of the electrostatic actuator of FIG. 4. Each of the sectors is connected arcuately from the lower-left direction toward the upper-right direction and corresponds to one of the drive electrode groups 109a through 109c shown in FIG. 4, to which a 3-phase voltage can be applied. FIG. 8A and FIG. 8B are schematic illustrations of possible potential distributions on part of the rotor located above the stator illustrated in FIG. 7A and FIG. 7B. Note that in FIGS. 7A through 8B, the lower end corresponds to the center of the rotor, while the upper end corresponds to an outer peripheral area of the rotor.

Firstly assume that the electric potentials of the drive electrode groups 109a, 109b and 109c are −, 0, and + respectively as shown in FIG. 7A. Then, electric charges are locally induced on the rotor 101 as shown in FIG. 8A. If the electric potentials of the drive electrode groups 109a, 109b and 109c are changed respectively to +, −, and 0 as shown in FIG. 7B, the rotor 101 is driven to rotate clockwise by the rightward rotary force and the downward centripetal force that are generated there as shown in FIG. 8B.

If the change of the potentials is repeated, the rotor 101 is moved to turn clockwise further in the direction of +θ. Since the rotor 101 is constantly subjected to a centripetal force toward the rotation axis, it can be driven to rotate on a stable basis without using any structural bearing.

Now, the present invention will be described further by way of examples.

EXAMPLE 1

Figure 9:
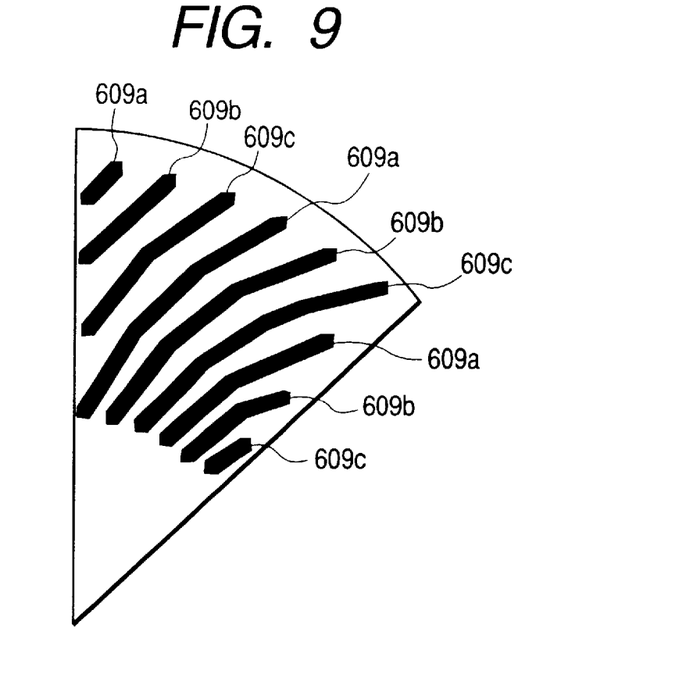
FIG. 9 is a schematic illustration of the pattern of arrangement of the electrodes of the stator of the electrostatic actuator of Example 1.

Now the electrostatic actuator of Example 1 will be described below. The electrostatic actuator of this example has a configuration the same as that of the above-described embodiment shown in FIG. 3. The stator 102 is made of glass and has a diameter of 50 mm and a height of 0.5 mm. FIG. 9 is a schematic illustration of the pattern of arrangement of the electrodes of the stator 102 of the electrostatic actuator of Example 1. Note that FIG. 9 shows only part of the electrode pattern as enlarged in the rotational direction for the purpose of simplicity and easy understanding.

The drive voltage is applied to the drive electrode groups 609a through 609c of FIG. 9 at respective phases of the voltage. Each of the drive electrodes of the drive electrode groups 609a through 609c has an arcuate profile extending from the center toward the outer periphery of the stator with its width proportional to the distance from the rotation center of the stator. With this arrangement, the induced electric charges on the rotor show a uniform distribution to make the rotor rotate on a stable basis.

In this example, any two adjacently located drive electrodes form a central angle of 1 degree and have a width of 17 to 87 $\mu$m. On the other hand, the rotor 101 is made of glass and has a diameter of 16 mm and a height of 0.5 mm. The oscillator 107 is a Langevin type oscillator (NBL-15602S: tradename available from Tokin) adapted to be tightened by means of a bolt and having a resonance frequency of 60 kHz.

The electrostatic actuator of this example was operated with an electrostatic drive voltage of 75V rms, a drive frequency of 10 to 50 Hz, an oscillator drive voltage of 35V rms and a gap of 10 $\mu$m separating the stator and the rotor to find that the electrostatic actuator could be driven to rotate bidirectionally on a stable basis.

EXAMPLE 2

Figure 10:
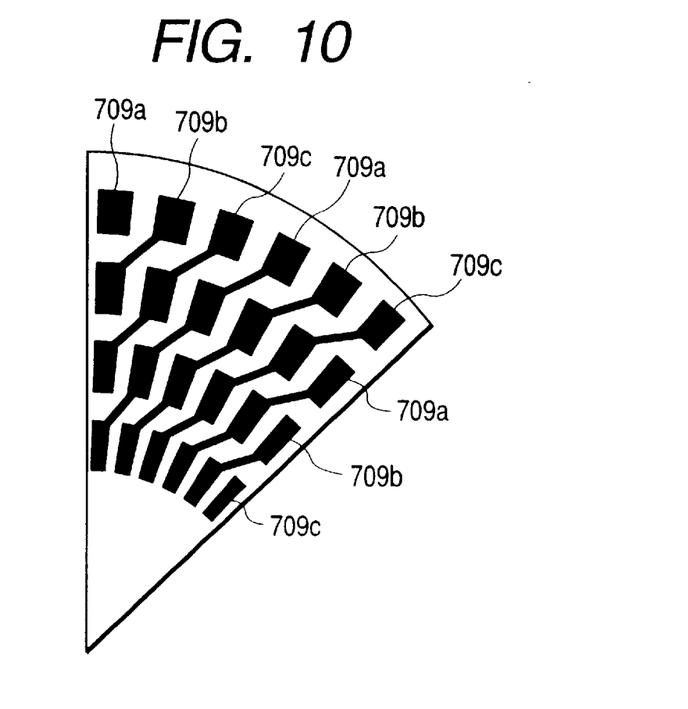
FIG. 10 is a schematic illustration of the pattern of arrangement of the electrodes of the stator of the electrostatic actuator of Example 2.

Now, the electrostatic actuator of Example 2 will be described below. The electrostatic actuator of this example has a configuration the same as that of the above-described embodiment shown in FIG. 3. The stator 102 is made of glass and has a diameter of 50 mm and a height of 0.5 mm. FIG. 10 is a schematic illustration of the pattern of arrangement of the electrodes of the stator 102 of the electrostatic actuator of Example 2. Note that FIG. 10 shows only part of the electrode pattern as enlarged in a rotational direction for the purpose of simplicity and easy understanding.

The drive voltage is applied to the drive electrode groups 709a through 709c of FIG. 10 at respective phases of the voltage. Each of the drive electrodes of the drive electrode groups 709a through 709c has sector-like sections that are connected to show a quasi-arcuate profile extending from the center toward the outer periphery of the stator. With this arrangement where each of the drive electrodes has sector-like sections, the drive electrodes can be densely distributed to reduce the distance separating adjacently located drive electrodes so that it is possible to bring the inductive electric charges generated on the rotor and the drive electrodes very close to each other to consequently raise the level of the force that is generated and applied to the rotor to drive the latter. Then, an electrostatic actuator of this example can be driven to operate with a low voltage when compared with conventional electrostatic actuators. Still additionally, since 3-phase drive electrodes can be arranged densely on the stator of an electrostatic actuator of this example so as to generate a rotary force at any position on the rotor, it is possible to drive the rotor to rotate bidirectionally.

In this example, any two adjacently located drive electrodes form a central angle of 1 degree and have a width of 28 to 140 $\mu$m so that they are located extremely close to each other. On the other hand, the rotor 101 is made of glass and has a diameter of 16 mm and a height of 0.5 mm. The oscillator 107 is a Langevin type oscillator (NBL-15602S: tradename available from Tokin) adapted to be tightened by means of a bolt and having a resonance frequency of 60 kHz.

The electrostatic actuator of this example was operated with an electrostatic drive voltage of 50V rms, a drive frequency of 10 to 50 Hz, an oscillator drive voltage of 35V rms and a gap of 10 $\mu$m separating the stator and the rotor to find that the electrostatic actuator could be driven to rotate bidirectionally on a stable basis.

EXAMPLE 3

Figure 11:
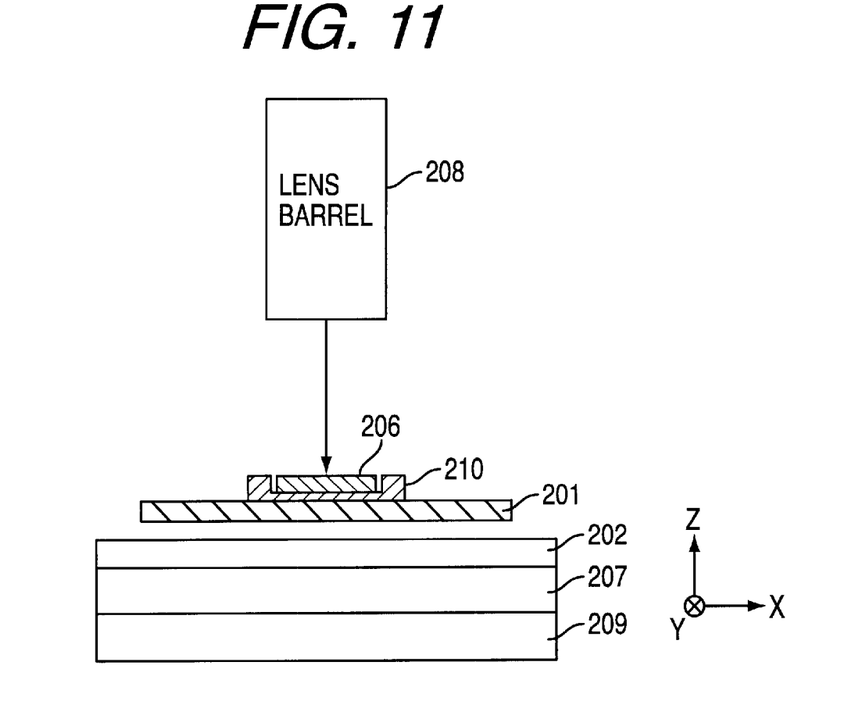
FIG. 11 is a schematic illustration of a rotary stage using an electrostatic actuator according to the invention.

In Example 3, a rotary stage that can be driven to rotate and also move along the Z-axis and is adapted to be used for an optical microscope was prepared by using an electrostatic actuator as described in Example 1 or 2. FIG. 11 is a schematic illustration of the rotary stage of this example. Note that the lens barrel 208 of an optical microscope is arranged in the Z-direction above the rotary stage in FIG. 11.

The rotary stage of this example comprises a stool 209, an oscillator 207 rigidly held to the stool 209 and a stator 202 arranged on the oscillator 207. A rotor 201 is arranged above the stator 202. A sample holding jig 210 is fitted onto the rotor 201 and a sample 206 is placed on the sample holding jig 210.

For driving the rotary stage of this example, an AC voltage is applied to the oscillator 207 to produce a squeeze film between the stator 202 and the rotor 201 and float the rotor 201. Then, a voltage is applied to the drive electrodes arranged in the stator 202 to drive the rotor 201 in order to rotate the entire sample 206 for a full examination. The rotor 201 can be moved along the Z-axis by changing the voltage being applied to the oscillator 207. The rotor 201 is driven to rotate by the electrostatic force acting on the inductive electric charges generated on the rotor 201.

The rotor 201 is driven to move along the Z-axis by the squeeze film produced there. Three-phase drive electrodes are formed in the stator 202 having a glass-made substrate to drive the rotor 201 to move along the axis of rotation and an insulating thin film is arranged on the surfaces of the drive electrodes to cover the latter.

Thus, a compact rotary stage having a simple configuration and adapted to align the rotor around the axis of bidirectional rotation and also along the Z-axis in a non-contact way was prepared in this example. Since the rotor is driven to rotate in a non-contact way, no friction occurs between the rotor and the stator and therefore no friction-related problems such as the emission of heat and that of noise arise. Thus, unlike a structural support mechanism such as a ball bearing, the rotary stage of this example that is free from friction provides the advantage of easy maintenance and hence can find applications in strict environments, such as a clean room, because it does not give rise to any dust.

EXAMPLE 4

Figure 12:
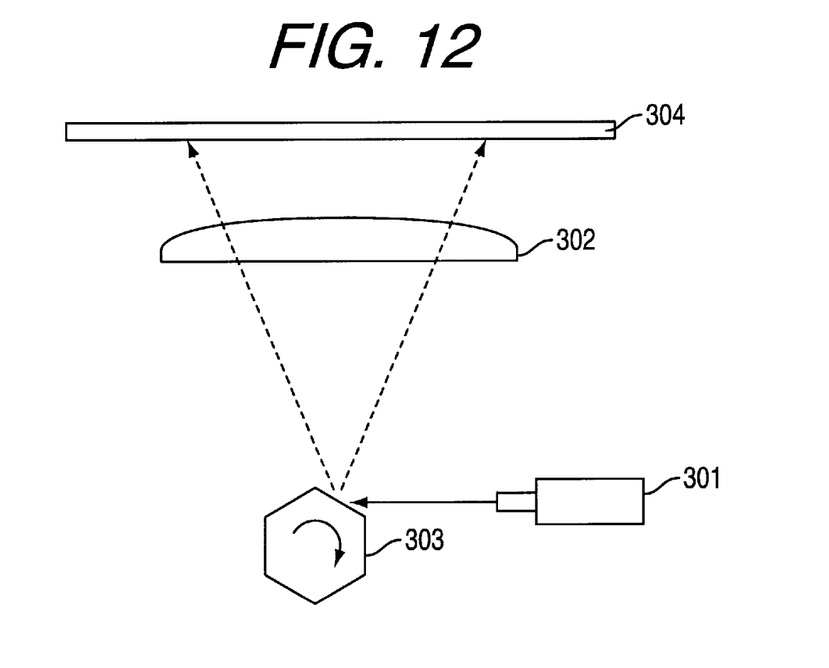
FIG. 12 is a schematic illustration of an optical scanning device using an electrostatic actuator according to the invention.

In Example 4, an optical scanning device was prepared by using an electrostatic actuator as described in Example 1 or 2. FIG. 12 is a schematic illustration of the optical scanning device of this example.

Polygon mirror 303 is driven to rotate at a high rate by means of an electrostatic actuator according to the invention. The laser beam emitted from a light source, which is a semiconductor laser 301, strikes the polygon mirror 303. The laser beam reflected (deflected) by the polygon mirror

303 is focussed on a projection surface 304 by means of a scanning lens 302. As the polygon mirror 303 is driven to rotate by the electrostatic actuator, the laser beam scans the projection surface 304.

A compact polygon mirror drive system that has a simple configuration and is adapted to support a polygon mirror in a non-contact way can be prepared by using an electrostatic actuator according to the invention. Since the rotor carrying the polygon mirror is driven to rotate in a non-contact way, no friction occurs between the rotor and the stator and therefore no friction-related problems such as the emission of heat and that of noise arise. Thus, unlike a structural support mechanism, such as a ball bearing, the polygon mirror drive system of this example that is free from friction provides the advantage of easy maintenance.

As described above in detail, according to the invention, there is provided a compact electrostatic actuator having a simple configuration and adapted to align the rotor around the axis of bidirectional rotation and also along the Z-axis in a non-contact way. Additionally, an electrostatic actuator according to the invention can suitably be applied to a stage to be used for an optical microscope that is adapted to move bidirectionally around the axis of rotation and also along the Z-axis or to a drive system to be used for driving a polygon mirror.

What is claimed is:

1. An electrostatic actuator comprising:
    a stator formed by a circular substrate having a surface carrying thereon a plurality of drive electrodes, each of said drive electrodes having an arcuate profile extending from the center of the substrate toward the outer periphery thereof;
    a rotor arranged opposite to the surface of said stator carrying thereon the drive electrodes; and
    a drive circuit for applying a drive voltage to the drive electrodes of said stator.

2. An electrostatic actuator according to claim 1, further comprising:
    an oscillator adapted to float said rotor above said stator by generating dynamic pressure between said stator and said rotor.

3. An electrostatic actuator according to claim 2, wherein said oscillator comprises an piezoelectric element and a power source for applying an AC voltage to said piezoelectric element.

4. An electrostatic actuator according to claim 3, wherein said oscillator further comprises a control circuit for controlling the amplitude of said AC voltage.

5. An electrostatic actuator according to claim 3, wherein the surface of the stator fitted to the oscillator has a surface area greater than the surface area of the oscillator held in contact with the stator.

6. An electrostatic actuator according to claim 1, wherein each of said drive electrodes has a profile of a plurality of sector-like sections connected to show a quasi-arcuate profile.

7. An electrostatic actuator according to claim 1, wherein each of said drive electrodes has a width proportional to the distance from the center of the substrate.

8. A rotary stage comprising:
    an electrostatic actuator according to any of claims 1 through 7; and
    a sample holding jig arranged on the rotor of said electrostatic actuator.

9. An optical scanning device comprising:
    a light source adapted to emit a laser beam;
    an electrostatic actuator according to any of claims 1 through 7; and
    a polygon mirror arranged on the rotor of said electrostatic actuator and adapted to deflect the laser beam emitted from said light source.

10. A method of driving an electrostatic actuator comprising a stator formed by a circular substrate having a surface carrying thereon a plurality of drive electrodes, each of said drive electrodes having an arcuate profile extending from the center of the substrate toward the outer periphery thereof, a rotor arranged opposite to the surface of said stator carrying thereon the drive electrodes, a drive circuit for applying a drive voltage to the drive electrodes of said stator and an oscillator for generating dynamic pressure between said stator and said rotor, said method comprising steps of:
    generating dynamic pressure between said stator and said rotor by means of said oscillator to float said rotor above said stator; and
    applying a multiphase drive voltage to said drive circuit to drive said rotor to rotate.

11. A method of driving an electrostatic actuator according to claim 10, wherein
    said oscillator comprises an piezoelectric element and a power source for applying an AC voltage to said piezoelectric element and the gap separating the stator and the rotor is regulated by changing the amplitude of the AC voltage being applied to the piezoelectric element.

* * * * *

UNITED STATES PATENT AND TRADEMARK OFFICE
CERTIFICATE OF CORRECTION

PATENT NO. : 6,472,795 B2  
DATED : October 29, 2002  
INVENTOR(S) : Futoshi Hirose et al.

It is certified that error appears in the above-identified patent and that said Letters Patent is hereby corrected as shown below:

<u>Title page,</u>  
Item [56], References Cited, U.S. PATENT DOCUMENTS,  
"Sumanaweera et all" should read -- Sumanaweera et al. --.

<u>Column 1,</u>  
Line 16, "rises" should read -- rise --.  
Line 49, "above described" should read -- above-described --.  
Line 52, "Secondary," should read -- Secondly, --.  
Line 62, "above identified" should read -- above-identified --.

<u>Column 2,</u>  
Line 54, "cross sectional" should read -- cross-sectional --

<u>Column 3,</u>  
Line 47, "A3-phase" should read -- A 3-phase --.  
Line 52, "cross" should read -- cross- --.

<u>Column 7,</u>  
Line 11, "therefore" should read -- therefore, --.  
Line 44, "an" should read -- a --.

Signed and Sealed this

Twenty-fourth Day of June, 2003

JAMES E. ROGAN  
*Director of the United States Patent and Trademark Office*

UNITED STATES PATENT AND TRADEMARK OFFICE
CERTIFICATE OF CORRECTION

PATENT NO. : 6,472,795 B2
DATED : October 29, 2002
INVENTOR(S) : Futoshi Hirose et al.

It is certified that error appears in the above-identified patent and that said Letters Patent is hereby corrected as shown below:

Title page,
Item [56], References Cited, U.S. PATENT DOCUMENTS,
"Sumanaweera et all" should read -- Sumanaweera et al. --.

Column 1,
Line 16, "rises" should read -- rise --.
Line 49, "above described" should read -- above-described --.
Line 52, "Secondary," should read -- Secondly, --.
Line 62, "above identified" should read -- above-identified --.

Column 2,
Line 54, "cross sectional" should read -- cross-sectional --

Column 3,
Line 47, "A3-phase" should read -- A 3-phase --.
Line 52, "cross" should read -- cross- --.

Column 7,
Line 11, "therefore" should read -- therefore, --.
Line 44, "an" should read -- a --.

Signed and Sealed this

Eighth Day of July, 2003

JAMES E. ROGAN
*Director of the United States Patent and Trademark Office*